April 9, 1968     M. D. GORDANIER     3,376,760
REGENERATIVE STEERING DIFFERENTIAL
Filed March 4, 1966     3 Sheets-Sheet 1
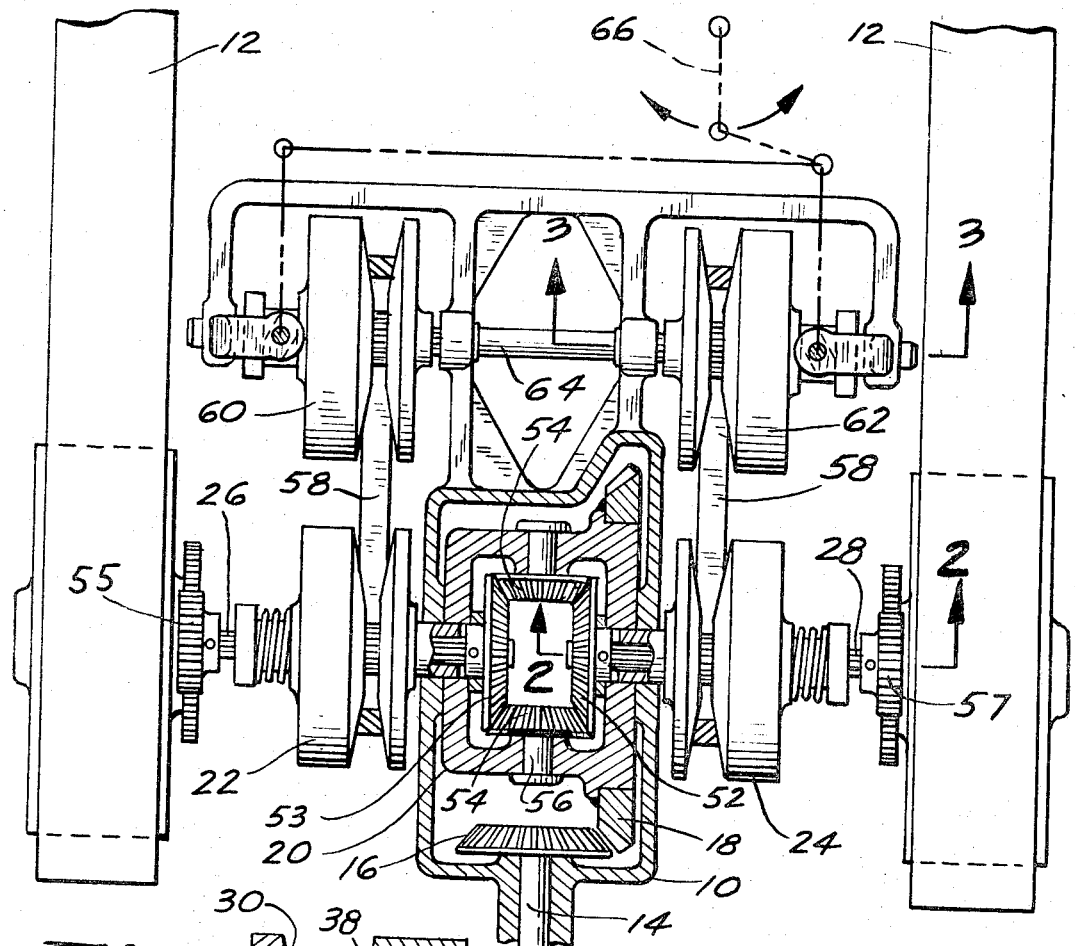
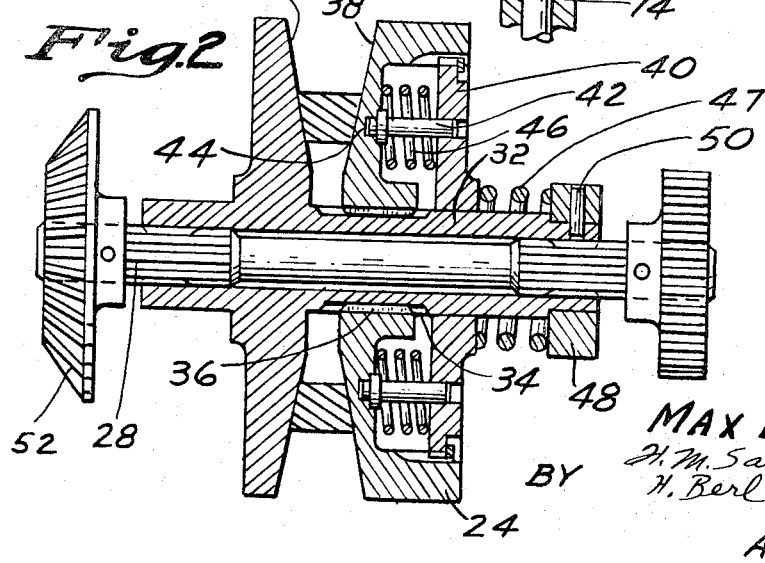
INVENTOR:
MAX D. GORDANIER
BY H. M. Saragovitz, E. J. Kelly
H. Berl and R. M. Lyon
ATTORNEYS April 9, 1968  M. D. GORDANIER  3,376,760
REGENERATIVE STEERING DIFFERENTIAL
Filed March 4, 1966  3 Sheets-Sheet 2

INVENTOR:
MAX D. GORDANIER
BY H.M. Saragovitz, E.J. Kelly
H. Berl and R.M. Lyon
ATTORNEYS

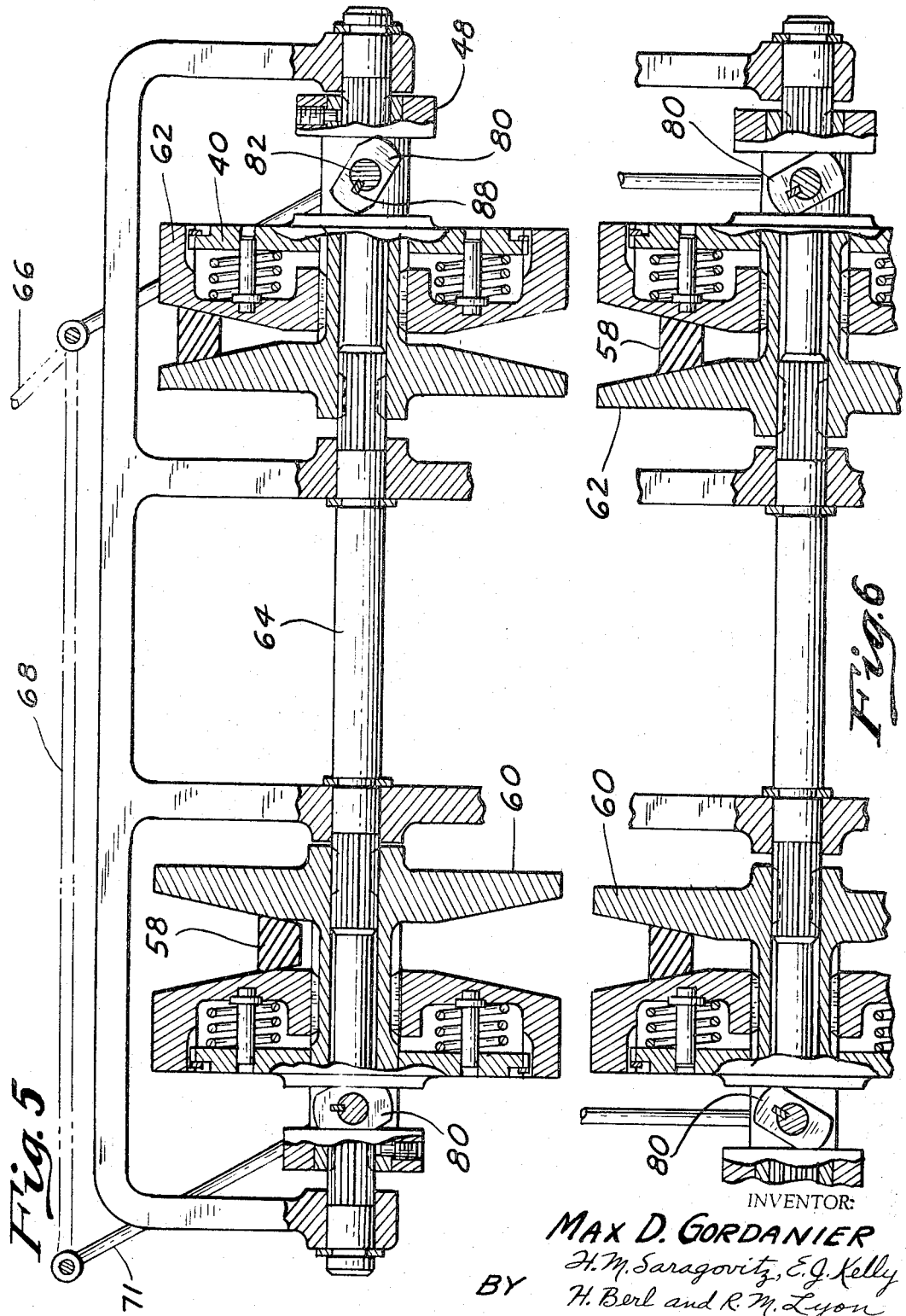

United States Patent Office 3,376,760
Patented Apr. 9, 1968

3,376,760
REGENERATIVE STEERING DIFFERENTIAL
Max D. Gordanier, Pleasant Ridge, Mich., assignor to the United States of America as represented by the Secretary of the Army
Filed Mar. 4, 1966, Ser. No. 534,292
1 Claim. (Cl. 74—689)

ABSTRACT OF THE DISCLOSURE

A vehicle skid steer system for steering a tracked vehicle or a wheeled vehicle wherein the wheels cannot be turned from their fixed alignment with the vehicle. Belt driven variable sheaves are utilized in a continuously variable transmission to bias the output of an automotive type differential such that the speed of the differential output shafts can be varied in a smooth, uninterrupted transition with respect to each other.

---

The invention described herein may be manufactured and used by or for the Government for governmental purposes without the payment to me of any royalty thereon.

The present invention relates to a regenerative steer system and more particularly to a regenerative steer system for track-laying or skid-steer type wheeled vehicles, i.e., wheeled vehicles, wherein the wheels cannot turn from their fixed alignment with the vehicle.

There are several methods of steering the above type vehicles which include braked differential, controlled differential, clutch brake, geared steer, double or triple differential, or any combination of the above. The common means for controlling the above mentioned systems, include mechanical, hydraulic, electrical, and pneumatic. This invention is a differential steer system since it employs a conventional differential together with two variable sheave V-belts or chains to provide a controllable, continuously variable ratio bias of the differential's output speed and torque.

An object of the present invention is to provide a steering system for track-laying or skid-steer vehicles.

Another object of the present invention is to use belt-driven variable sheaves in a continuously variable transmission to bias the output of an automotive type differential.

A further object of the invention is to provide a regenerative controlled differential steer system wherein the speed of each output shaft of an automative type differential is controlled by connecting a transmission or any speed and/or torque changing device between each output, in parallel with the differential, in order to provide a smooth uninterrupted change in the speed of one output in relation to the other.

Other objects and many of the attendant advantages of this invention will be readily appreciated as the same becomes better understood by reference to the following detailed description when considered in connection with the accompanying drawings, in which like reference numerals designate like parts throughout the figures thereof. It is to be understood that no limitation of the scope of the invention is intended thereby since the invention is capable of other embodiments and of being carried out in various alternate ways which will be obvious to one skilled in the art.

In the drawings:

FIG. 1 shows a plan view, partly in section, of a preferred embodiment of the invention wherein there is constant output speed of both right and left side drives.

FIG. 2 shows a section of the device taken on lines 2—2 of FIG. 1 looking in the direction of the arrows.

FIG. 5 shows an enlarged plan view, partly in section, of the cam controlled sheaves in the position show in FIG. 4.

FIG. 6 shows an enlarged plan view, partly in section, of the cam controlled sheaves in the position shown in FIG. 1.

Figure 4:
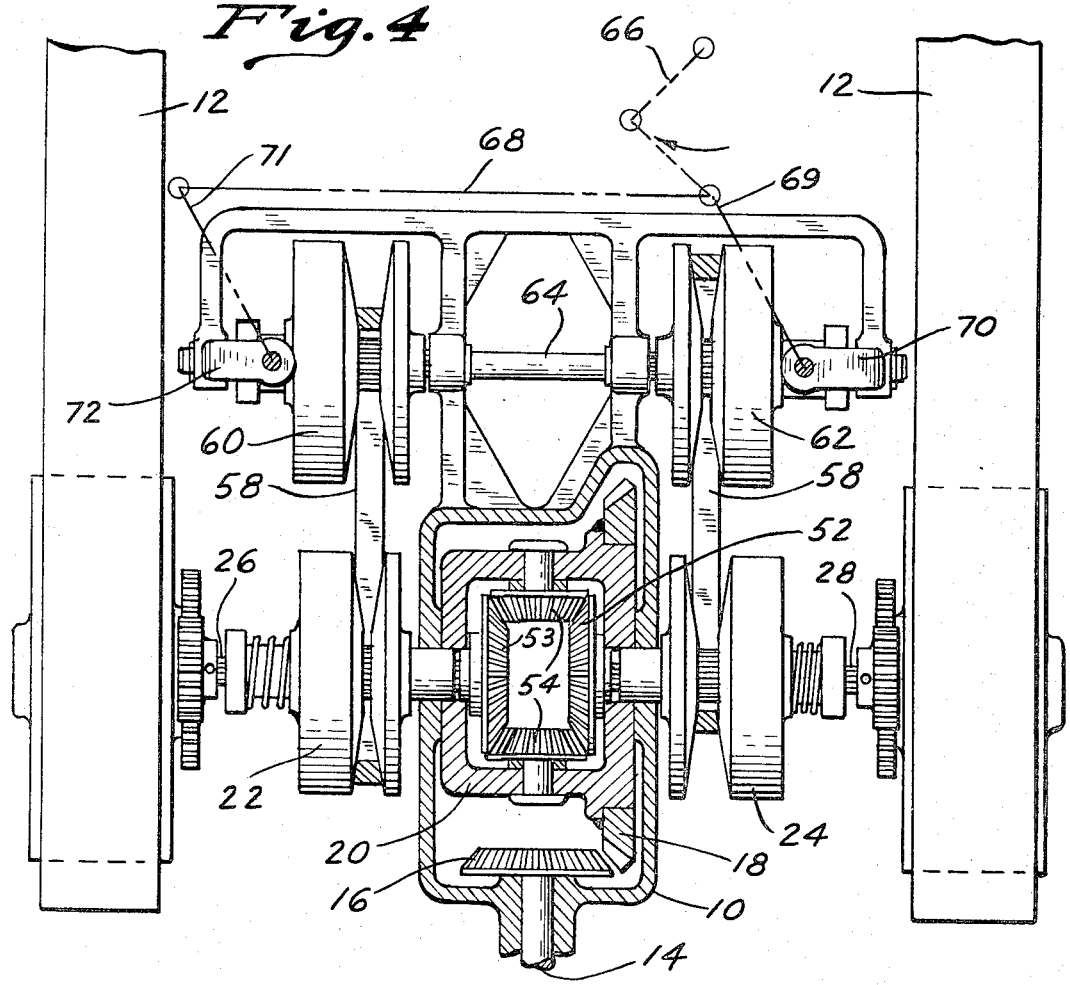
FIG. 4 shows a plan view, partly in section, wherein the device is shown in extreme position for maximum ratio of right and left hand drives.

Referring now to the drawings, FIG. 1 shows the invention as applied to a tracked vehicle. The vehicle includes a frame 10 carrying a means to transmit power to a pair of endless tracklaying units 12. In lieu of the tracklaying units the vehicle may be supported on spaced skid-steer type wheels. Extending from and journaled in frame 10 is a power shaft 14 which is connected to an engine (not shown). A bevel drive pinion 16 is mounted on shaft 14 and is driven thereby. The teeth of gear 16 mesh with the teeth of bevel drive gear 18 which is fixedly secured to the differential carrier 20.

Variable diameter pulleys 22 and 24 are mounted with splines on axle shafts 26 and 28 respectively. As can be seen in FIG. 2, which shows a cross section thru pulley 24, each of the identical pulley assemblies 22 and 24 consists of an inboard plate 30 secured to the axle shafts by means of hubs 32 which surround the drive shafts on both sides of plate 30. The outboard portion of hub has external splines 34 for slidable cooperation with internal splines 36 on an outboard plate 38. A disc 40 is slidably mounted on hub 32 and carries guide pins 42 which in turn engage drillings 44 within the plate 38, and a compression spring 46 surrounds the pins and reacts between the disc 40 and outboard plate 38. A larger compression spring 47 surrounds the outboard portion of the hub 32 and reacts between the disc 40 and a ring 48 which is secured in place on axle 28 by means of set screw 50.

The inboard portion of the hubs 32 extend through the side walls of frame 10 a sufficient distance to rotatably support carried 20 to the frame. Shafts 26 and 28 extend beyond hubs 32 so that differential side gears 52 and 53 can be mounted thereon. Differential pinion gears 54 are mounted in carrier differential 20 by means of shafts 56 mounted at right angles to shafts 26 and 28 and gears 54 are meshed with gears 52 and 53 to transmit power to the output shafts 26 and 28. Drive gears 55 and 57 are attached to the outboard portion of shafts 26 and 28 to mesh with the drive assemblies of tracklaying units 12.

Pulleys 60 and 62, which are fixed on shaft 64, are connected by belts 58 to pulleys 22 and 24 and have their effective diameters controlled by the driver of the vehicle by moving a control lever indicated by the dashed lines at 66 in FIG. 1. The operator, by moving control lever 66 to the left, as shown in FIG. 4, causes interconnecting links 68 and 69 to move to the left and acting through yoke connection 70 and cams 80 (FIG. 5), compresses the two halves of pulley 62, thereby increasing its effective diameter. At the same time, interconnecting link 71, acting through yoke connection 72 and cams 80, allows the two halves of pulley 60 to spread apart, thereby decreasing its effective diameter. The further lever 66 is moved to the left, the greater the difference in the diameters of pulleys 60 and 62. Moving lever 66 to the right will cause the opposite reaction, decreasing the effective diameter of pulley 62 and increasing the effective diameter of pulley 60.

Referring to FIG. 4, it will be seen that decreasing the effective diameter of pulley 60 and increasing the effective diameter of pulley 62 will force the effective diameter of pulley 22 to increase and of pulley 24 to decrease, thus decreasing the speed of output shaft 26 and increasing the speed of output shaft 28, causing the vehicle to turn to the left. Moving lever 66 to the right causes an opposite reaction and the vehicle will turn to the right. This speed change is possible due to the fact that pulleys 60 and 62 are both fixed on shaft 64.

Figure 3:
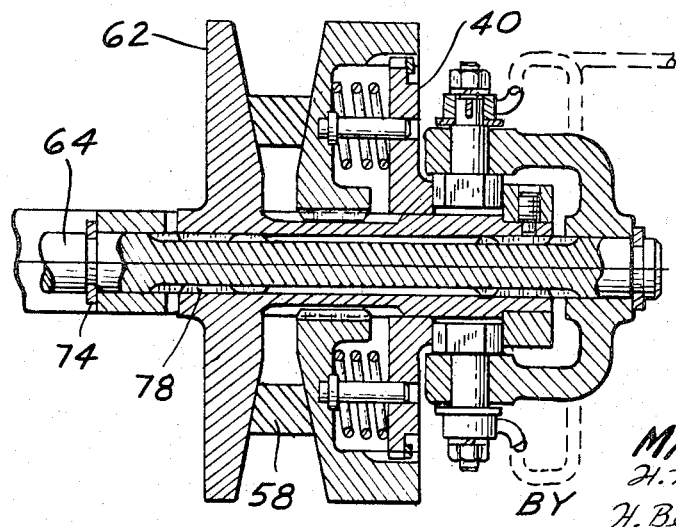
FIG. 3 shows a section of the device taken on line 3—3 of FIG. 1 looking in the direction of the arrows.

Pulleys 60 and 62 are identical in construction; pulley 62 is shown in FIG. 3. Shaft 64 extends through the frame 10 and is held in position by means of snap rings 74 while being connected to the pulleys by external splines 76 on the shaft and internal splines 78 on the pulley. The cams 80 are located in guideways formed between the disc 40 and ring 49 for rotation about pin 82 which is journaled in the yoke connection 70. The cams 80 are actuated by the control links 68 and 69 and are secured to the pins 82 by means of keys 88.

A decrease in the effective diameter of pulley 24 will speed up output shaft 28 and gear 52. Gears 54 will rotate on their axis, trying to turn gear 53 in reverse. However, as the complete assembly of carrier 20 is rotating and carrying gears 52, 53, and 54 forward, gear 53 and shaft 26 do not reverse direction, but run at a slower speed. This speed ratio between output shafts 26 and 28 is controlled by and dependent upon the ratio of the belts and variable pulleys 22, 24, 60 and 62.

Wedging action on the V-belts 58 by the large compression springs 47 on the floating unit discs 40 forces the V-belts to the largest effective diameter of the sheave which the belt can reach as determined by the adjusting of the width or gap of the cam controlled pulleys 60 and 62. To facilitate adjustment and prevent jamming or slippage of the V-belts and secure simultaneous action of both the right and left hand drives, the small compression springs 46 are provided in each unit to provide a flexing action to permit gradual adjustment of the belts. For example, the right hand belt 58 will climb to the outer edge on the right hand pulley 62 in the turning position shown in FIG. 4. At the same time internal compression springs 46 will cooperate with the one large spring 47 of pulley 24 and allow plate 38 to be forced to the right, as shown in FIG. 2, in a relatively gradual manner. By this arrangement pulley 22 closes and opens by torque responsive friction of the belt and pulley in cooperation with the biasing action of the springs.

Obviously many modifications and variations of the present invention are possible in the light of the above teachings. It is therefore to be understood, that within the scope of the appended claims, the invention may be practiced otherwise than as specifically described.

What is claimed is:
1. A vehicle skid steer system comprising
a differential connected to a means for transmitting power to said differential,
an axle speed regulation means connected in parallel with said differential for proportioning the output speed of the axles from the differential including
    a sheave which is variable in effective diameter on each axle,
    two sheaves which are variable in effective diameter mounted on a shaft parallel to said axles, and
    transmission belts drivingly connecting the sheave on each axle with one of the sheaves on said shaft, and
means to change the effective diameter of said sheaves on said shaft,
each of said sheaves including
    a stationary portion,
    an axially movable portion which is axially displaced from said stationary portion,
    a disc portion which is axially displaced from said axially movable portion, and
    a tension compensating spring located intermediate said disc and said movable portion,
said means to change the effective diameter of said sheaves including cams for exerting a force on said sheaves on said shaft in a direction which is perpendicular to the rotational plane of said sheaves thereby causing said transmission belts to frictionally alter the effective diameter of the sheaves on said axles so as to cause inversely proportional speed changes on said axles which changes the directional movement of the vehicle.

References Cited
UNITED STATES PATENTS

| | | | |
|---|---|---|---|
| 745,952 | 12/1903 | Barnard | 74—689 |
| 1,483,959 | 2/1924 | Welch | 74—710.5 X |
| 2,313,436 | 3/1943 | Hennessy | 74—230.17 |
| 2,582,966 | 1/1952 | Curtis | 74—722 X |
| 2,611,277 | 9/1952 | Mitchell | 74—230.17 |
| 2,623,410 | 12/1952 | Billey | 74—689 |
| 2,989,125 | 6/1961 | Hoppenworth | 74—722 X |
| 3,146,633 | 9/1964 | Schmitter et al. | 74—722 X |
| 3,269,218 | 8/1966 | Fisher | 74—722 X |

FOREIGN PATENTS

| | | |
|---|---|---|
| 524,526 | 5/1931 | Germany. |

DONLEY J. STOCKING, Primary Examiner.

THOMAS C. PERRY, Examiner.